United States Patent [19]

Ninomiya et al.

[11] 4,448,171
[45] May 15, 1984

[54] METHOD AND APPARATUS FOR OPTIMUM CONTROL OF INTERNAL COMBUSTION ENGINES

[75] Inventors: Masakazu Ninomiya; Atsushi Suzuki, both of Kariya, Japan

[73] Assignee: Nippondenso Co., Ltd., Kariya, Japan

[21] Appl. No.: 386,096

[22] Filed: Jun. 7, 1982

[30] Foreign Application Priority Data

Jun. 8, 1981 [JP] Japan .................................. 56-87702

[51] Int. Cl.³ .......................... F02P 5/08; F02P 5/04; F02B 3/04
[52] U.S. Cl. .................................... 123/419; 123/418
[58] Field of Search ............... 123/419, 418, 415, 416, 123/417; 364/431.05, 431.04, 442, 158

[56] References Cited

U.S. PATENT DOCUMENTS

| | | | |
|---|---|---|---|
| 4,026,251 | 5/1977 | Schweitzer et al. | 123/419 |
| 4,092,955 | 6/1978 | Reddy | 123/419 |
| 4,258,684 | 3/1981 | Schira | 123/418 |
| 4,343,278 | 8/1982 | Asano | 123/419 |
| 4,373,487 | 2/1983 | Komurosaki et al. | 123/418 |
| 4,374,510 | 2/1983 | Komurosaki et al. | 123/418 |
| 4,379,333 | 4/1983 | Ninomiya et al. | 123/419 |
| 4,380,800 | 4/1983 | Wilkenson | 123/419 |

*Primary Examiner*—Raymond A. Nelli
*Attorney, Agent, or Firm*—Cushman, Darby & Cushman

[57] ABSTRACT

In an optimum control for an internal combustion engine, a engine is operated by dithering the value of a selected one of engine operating control variables from a value of the selected control variable which is obtained by calculation in accordance with detected values of operating parameters of the engine, and a direction of improving either one of a fuel consumption rate and an output of the engine is decided on the basis of a detected change of an engine operating condition, thereby correcting the value of the selected control variable. In the optimum control, the time period for detecting a change of an engine speed within the time period for effecting the dithering is increased or decreased as the engine speed increases or decreases, respectively. Thus, this optimum control makes it possible to perform accurate control with a reduced dither quantity and a shorter dither period than previously.

7 Claims, 16 Drawing Figures

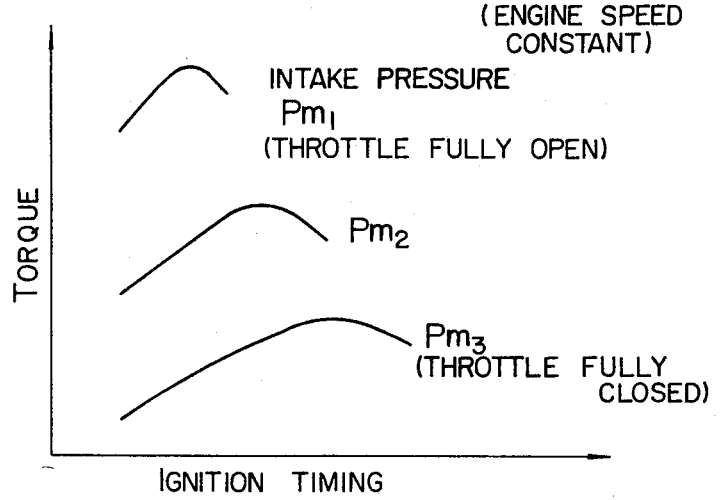
FIG. 6
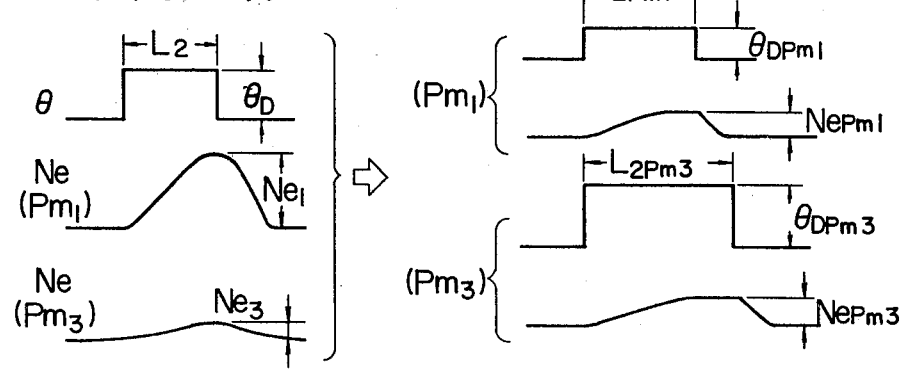
FIG. 7A
FIG. 7B

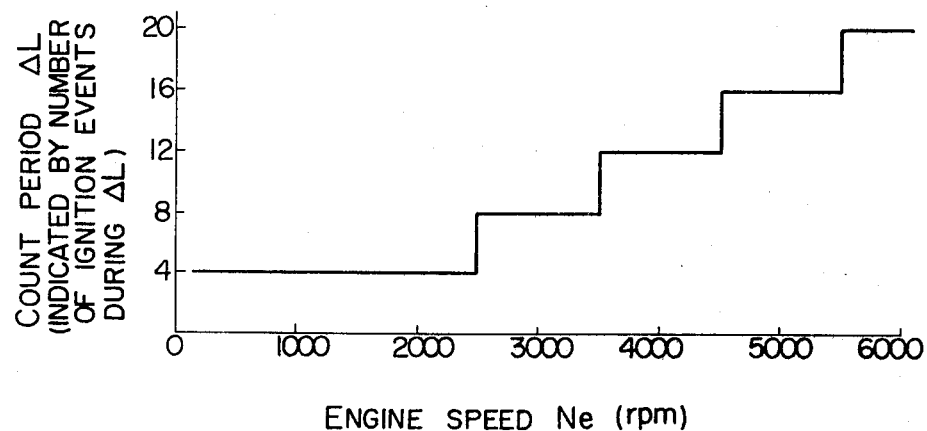
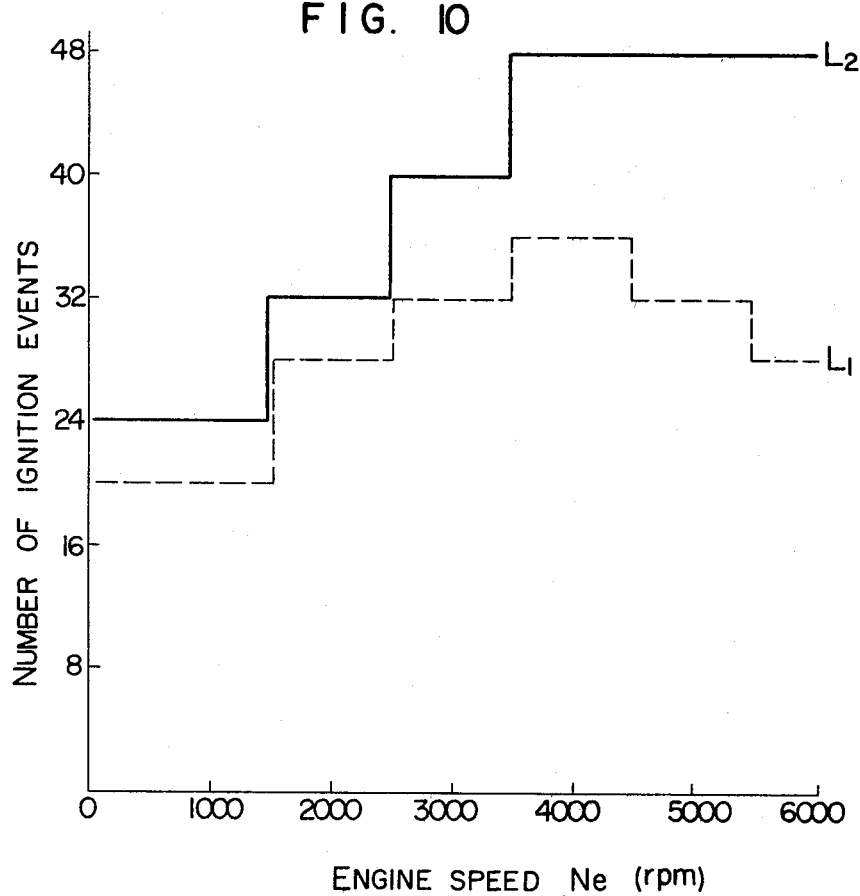

FIG. 11

| Ne\Pm | --- | --- | r-2 | r-1 | r | r+1 | r+2 | --- | --- |
|---|---|---|---|---|---|---|---|---|---|
| --- | | | | | | | | | |
| --- | | | | | | | | | |
| p-1 | | | $\theta_B(p-1,r-2)$ | $\theta_B(p-1,r-1)$ | $\theta_B(p-1,r)$ | $\theta_B(p-1,r+1)$ | $\theta_B(p-1,r+2)$ | | |
| p | | | $\theta_B(p,r-2)$ | $\theta_B(p,r-1)$ | $\theta_B(p,r)$ | $\theta_B(p,r+1)$ | $\theta_B(p,r+2)$ | | |
| p+1 | | | $\theta_B(p+1,r-2)$ | $\theta_B(p+1,r-1)$ | $\theta_B(p+1,r)$ | $\theta_B(p+1,r+1)$ | $\theta_B(p+1,r+2)$ | | |
| --- | | | | | | | | | |
| --- | | | | | | | | | |

ENGINE SPEED Ne →

INTAKE PRESSURE Pm →

METHOD AND APPARATUS FOR OPTIMUM CONTROL OF INTERNAL COMBUSTION ENGINES

BACKGROUND OF THE INVENTION

1. Field of the Invention

The present invention relates to an optimum control for internal combustion engines, which feedback-control the ignition timing and air-fuel ratio so as to improve the output and fuel consumption rate of an engine.

2. Description of the Prior Art

The ignition timing for most internal combustion engines is adjusted, unless there exists any special reason such as the requirements from knocking or exhaust gas characteristics, in accordance with the operating conditions of the engine, namely, on the basis of an engine speed, intake pressure, etc., so as to simultaneously attain a maximum output and a minimum fuel consumption rate for the engine. However, the effect of these prior art methods is limited and they inevitably suffer some losses in both engine output and fuel consumption rate. For instance, such losses are caused by such factors as the variations in performance among manufactured engines, the variations in ignition timing correction, the changes in ambient conditions, etc.

Techniques have been devised for feedback-controlling the ignition timing of an engine so as to eliminate such losses and provide a maximum engine output. In an example of these ignition timing feedback control techniques, the ignition timing of an engine is controlled at an optimum ignition timing which provides a maximum engine torque by selecting at least two ignition timings which are different from each other and are in the vicinity of but apart by a given ignition angle from a calculated ignition timing obtained in accordance with the operating conditions of the engine, operating the engine at the at least two selected ignition timings alternately for a given time period, detecting a signal indicative of the engine speed when the engine is operated at each of the at least two ignition timings, comparing with one another the engine speed signals obtained at at least three successive operating points during the operation of the engine at each of the at least two selected ignition timings, deciding whether the calculated ignition timing is advanced or retarded from an optimum ignition timing (the minimum spark advance for best torque or MBT) and then correcting the calculated ignition timing in accordance with the result of the decision.

In accordance with this technique in which a change in the output is determined on the basis of a change in the engine speed, although the engine speed varies naturally due to various factors, it is possible to discriminate whether the actual change in the engine speed is due to the variation of the ignition timing or any other external factor (e.g., an accelerator pedal operation) and to prevent erroneous correction control of the ignition timing in a direction opposite to the optimum ignition timing by interrupting the ignition timing correction during acceleration and deceleration periods, slope ascending and descending periods, etc.

With the above-mentioned prior art control technique, however, if the response of the engine speed is slow when the engine is operated for a given time period at each of the two different ignition timings, since the engine speeds are obtained in terms of average values during the respective given time periods and they are compared with each other, the ability of detecting the difference of the changes of the engine speed becomes insufficient and thus the length of the given time period has to be extended to make up for the insufficient ability.

In the description to follow, the operation of intentionally varying a control variable for controlling the operation of the engine and the resulting change in the operating condition to thereby effect the optimum control of the engine is referred to as "dither" and the period of time during which the dither is effected is referred to as a "dither period". Also, an amount of change of the control variable for effecting the dither is referred to as a "dither quantity".

Further, an internal combustion engine is hereinafter simply referred to as an engine.

The present invention has been made with a view to solving the foregoing problems in the prior art.

SUMMARY OF THE INVENTION

It is an object of the present invention to provide a method and apparatus for optimum control of internal combustion engines in which in effecting the optimum control of the engine, a time period for obtaining an engine speed to be compared (a comparison period) is selected to be near the end of a dither period and in addition the comparison period is varied depending on the magnitude of the engine speed to elevate the ability of detecting changes of the engine speed thus making it possible to shorten the dither period and thereby to raise the speed of correcting the control variable toward its optimum value.

BRIEF DESCRIPTION OF THE DRAWINGS

FIG. 6 is a characteristic diagram showing the relation between the output torque and ignition timing.

FIGS. 7A and 7B are diagrams showing respectively the manner of the change of the engine speed depending on the dither period.

FIG. 8 is a characteristic diagram showing the count period determined in this invention.

FIG. 10 is a characteristic diagram showing the relation of the dither period indicating ignition events number and the count starting ignition events number versus the engine speed.

FIG. 11 shows a data map of basic ignition angles stored in the RAM shown in FIG. 2.

In the drawings, like reference numerals and symbols refer to like parts or items.

DESCRIPTION OF THE PREFERRED EMBODIMENTS

A method and apparatus for optimum control of internal combustion engines of this invention which use the ignition timing as a control variable for attaining a maximum engine torque will now be described with reference to the embodiments shown in the accompanying drawings.

Figure 1:
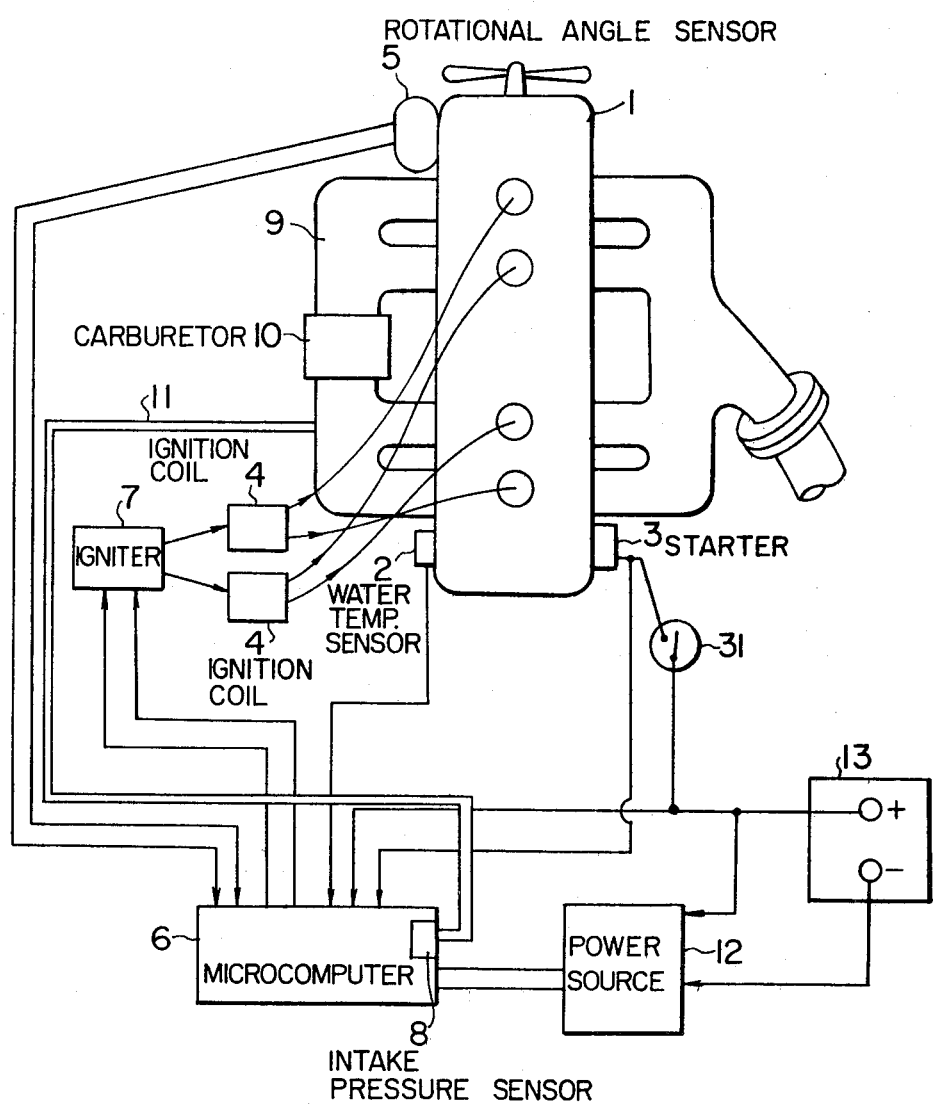
FIG. 1 is a block diagram showing the construction of an example of an ignition timing control apparatus according to this invention.

In FIG. 1, reference numeral 1 designates a four-cylinder, four-cycle engine, and 2 a water temperature sensor for detecting the temperature of the engine cooling water. Numeral 3 designates a starter, and 31 a starter switch. Numeral 5 designates a rotational angle sensor for detecting the crack angle of the engine 1, which generates a top dead center (TDC) signal when the TDC position is reached during the rotation of the engine 1 and which generates a rotational angle signal at every rotation through a given crank angle obtained by equally dividing the angle of one engine rotation (30° crank angle is used in this embodiment and all angles in the following description will be given in terms of crank angle degrees). Numeral 6 designates a microcomputer, 10 a carburetor, and 8 an intake pressure sensor incorporated in the microcomputer 6 for measuring the pressure within an intake manifold 9 which is transmitted to the pressure inlet port of the intake pressure sensor 8 by way of a pipe line 11. Numerals 4 and 7 designate ignition devices. The present embodiment uses a distributorless ignition system using two ignition coils, in which numeral 4 designates ignition coils and numeral 7 designates an igniter.

The microcomputer 6 computes the engine speed from the time interval between the rotational angle signals generated from the rotational angle sensor 5 and also computes the intake pressure from the output voltage of the intake pressure sensor 8, thereby measuring the operating condition of the engine 1 and then controlling the ignition timing. Also, in order to control the ignition timing at an ignition angle specified for the start of the engine, the voltage supplied to the starter 3 through the starter switch 31 is applied as a starter signal to the control microcomputer 6. In addition, the battery voltage is applied as a battery voltage signal to the microcomputer 6 so as to vary the energizing current duration of the ignition coils 4 in accordance with the battery voltage. Numeral 12 designates a power source for generating the voltage required by the microcomputer 6 from the voltage of a battery 13 mounted on the vehicle.

Figure 2:
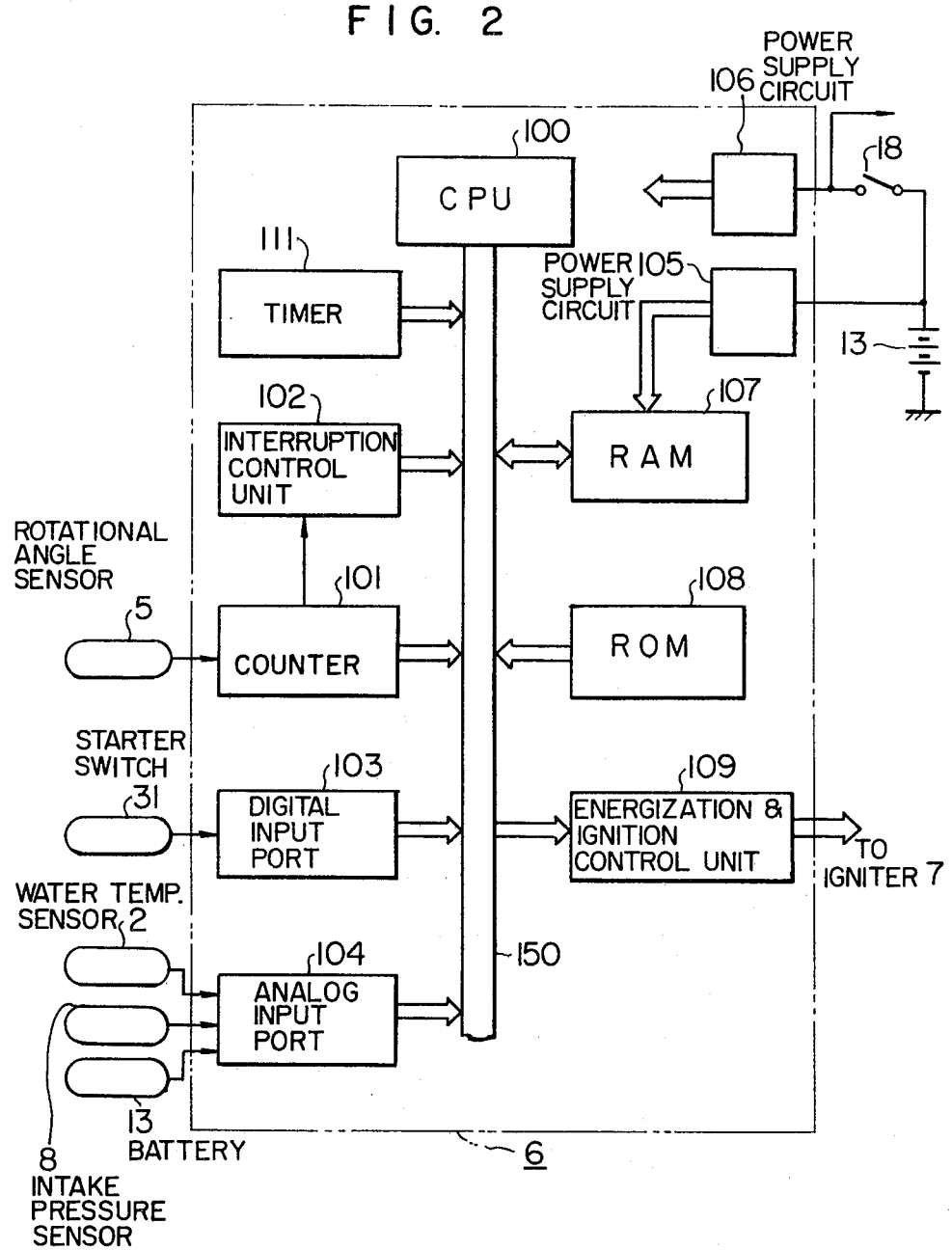
FIG. 2 is a block diagram showing the construction of the computer shown in FIG. 1.

The construction of the microcomputer 6 will now be described in detail with reference to FIG. 2. Numeral 100 designates a microprocessor (CPU) for computing the ignition timing, and 101 a counter responsive to the signals from the rotational angle sensor 5 for counting the number of the engine rotation. The counter 101 also applies an interruption command signal to an interruption control unit 102 in synchronism with a predetermined crank angle. When the interruption control unit 102 receives the interruption command signal, the unit 102 applies an interruption signal to the CPU 100 by way of a common bus 150. Numeral 103 designates a digital input port used for inputting a logical signal, namely, the input voltage signal applied through the starter switch 31 which shows that the starter 3 is in operation. Numeral 104 designates an analog input port having the function of subjecting the signals from the water temperature sensor 2, the intake pressure sensor 8 and the battery 13 to analog-to-digital (A/D) conversion and successively inputting the digital data into the CPU 100. The output data from the units 101, 102, 103 and 104 are transmitted to the CPU 100 via the common bus 150.

Numeral 105 designates a power supply circuit for supplying electric power to a temporary memory unit or a RAM 107 which will be described later. Numeral 18 designates a key switch, and the power supplying circuit 105 is connected to the battery 13 directly but not via the key switch 18. A power supply circuit 106 supplies electric power to the elements other than the RAM 107. The RAM 107 is a temporary memory unit which is used for temporarily storing information data during the processing of a program. The RAM 107 is a non-volatile memory so constructed that it is always supplied with electric power independently of the state of the key switch 18 thereby to prevent its stored contents from being lost even when the key switch 18 is turned off and the engine stops operating. Numeral 108 designates a read-only memory (ROM) for storing the program, various constants, etc. Numeral 109 designates an energization (dwell) and ignition control unit comprising a down counter including a register and operating as an energization (dwell) and ignition timing controlling counter, which converts digital signals indicative of the igniter energization time and the ignition timing computed by the CPU 100 to output signals for actually controlling the igniter 7. Numeral 111 designates a timer for measuring the elapsed time and transmitting the result of its measurement to the CPU 100.

The counter 101 counts 8 µs clock pulses and measures the engine speed from the count value of the 8 µs clock pulses in response to the output of the rotational angle sensor 5 once for every half rotation of the engine, thereby supplying an interruption command signal to the interruption control unit 102 at a predetermined angle. In response to the interruption command signal, the interruption control unit 102 generates an interruption signal, which is supplied to the CPU 100 causing it to execute an interruption processing routine for computing the ignition timing.

Figure 3:
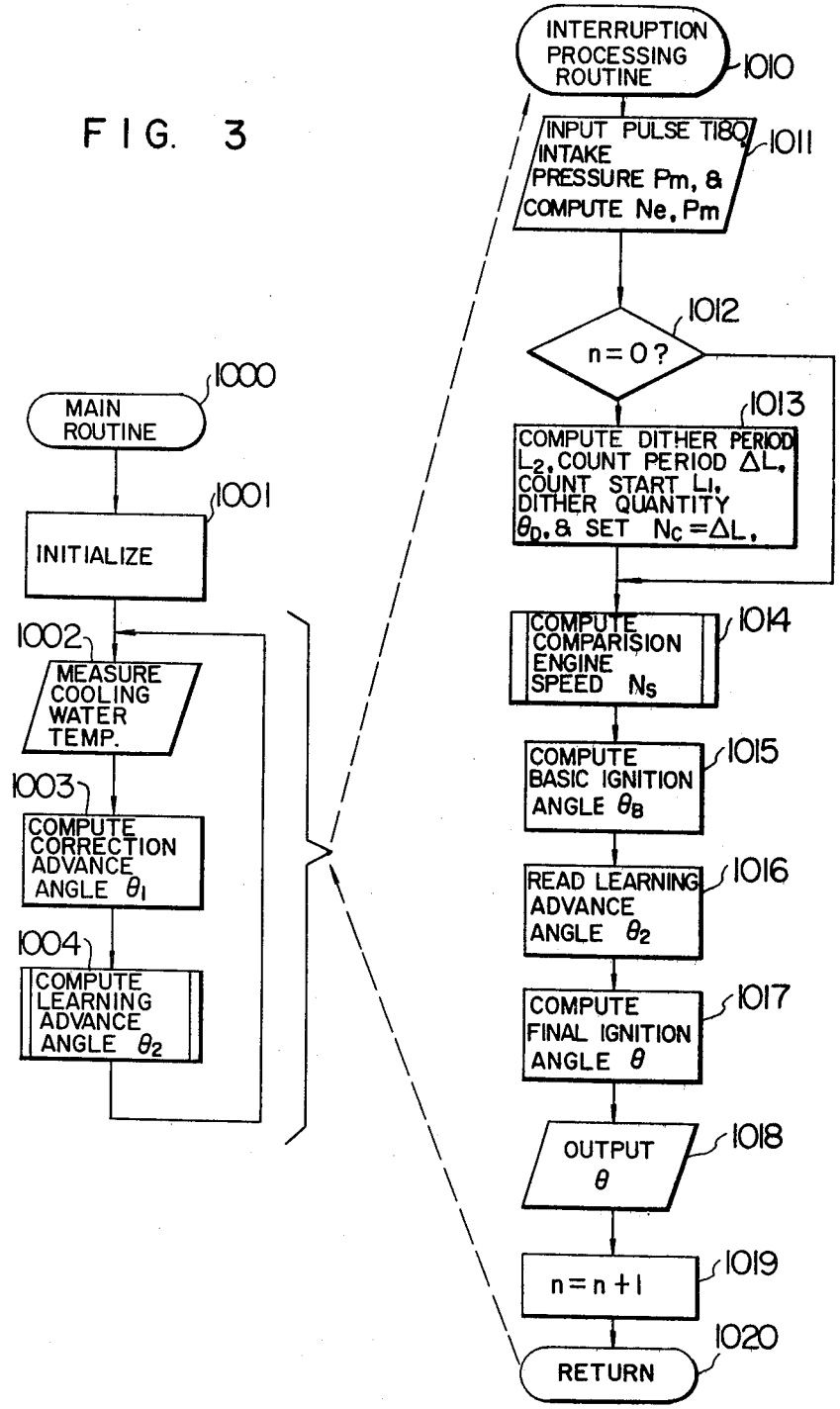
FIGS. 3 to 5 show flow charts for the computation procedure of the computer shown in FIG. 2.

FIG. 3 is a simplified flow chart showing the computation procedure of the CPU 100, and the function of the CPU 100 as well as the operation of the apparatus as a whole will now be described with reference to this flow chart.

When the key switch 18 and the starter switch 31 are turned on to start the engine, a step 1000 starts the processing of the main routine, and then a step 1001 effects the initialization. A step 1002 reads in a digital value indicative of the water temperature from the analog input port 104. A step 1003 computes from the water temperature data a correction advance angle $\theta_1$ for correcting a basic advance angle $\theta_B$ (shown in FIG. 11) which will be described later and stores the result in the RAM 107. A step 1004 performs addition and subtraction to compute a learning advance angle $\theta_2$, which will also be described later, for correcting the basic advance angle $\theta_B$ and stores the result in the RAM 107.

Figure 4:
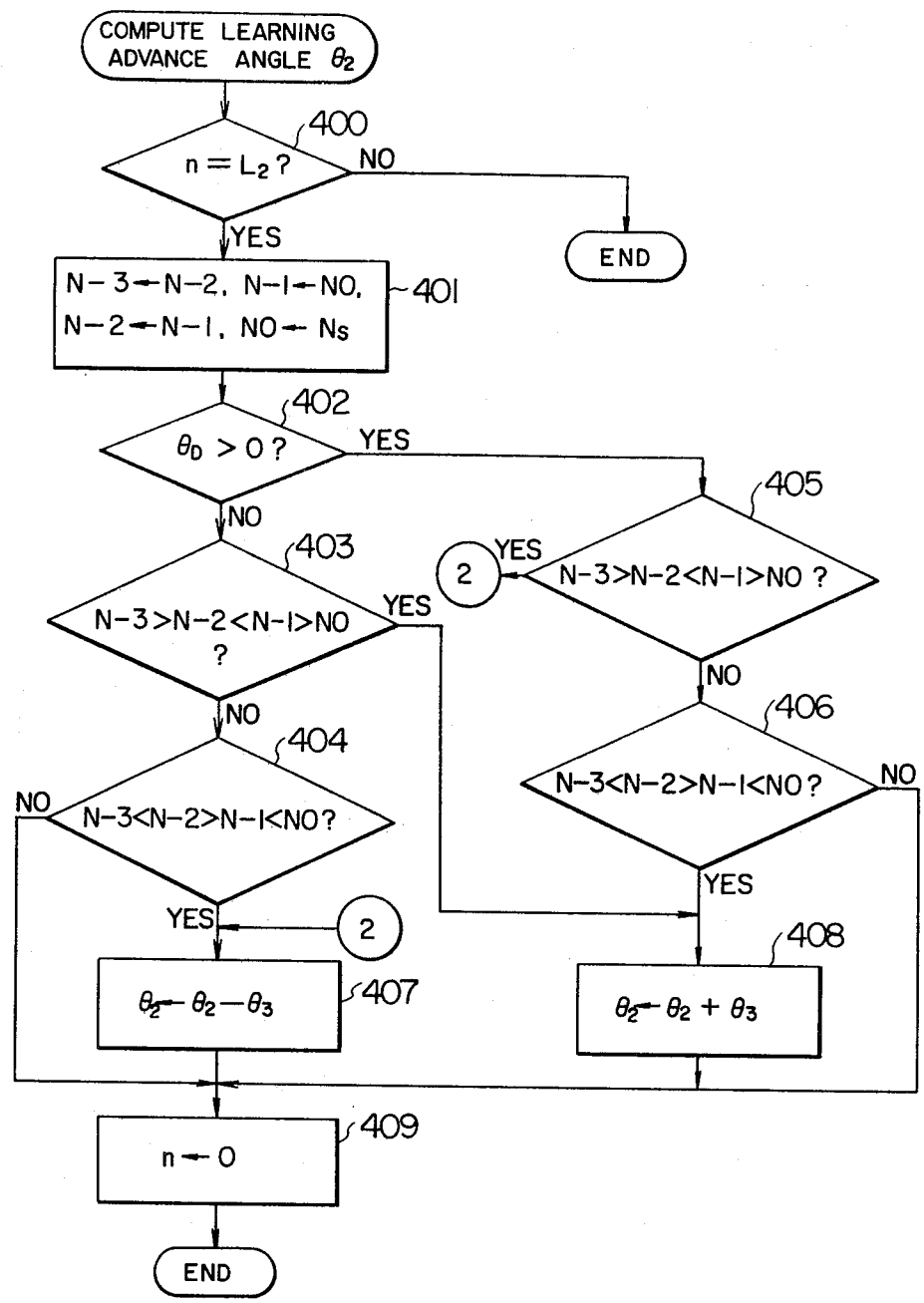

FIG. 4 shows a detailed flow chart for the step 1004 for correcting and storing the learning advance angle $\theta_2$, that is, performing the processing on the learning advance angle $\theta_2$. A step 400 determines whether the ignition event count value has reached a preset number $L_2$ which indicates the end of a dither period. So long as the preset number $L_2$ is not reached, the selection from the RAM 107 of the learning advance angle $\theta_2$ corresponding to the engine operating condition at the time of the current processing is repeated, but the processing proceeds to a step 401 when the preset number $L_2$ is reached. Usually, the processing of the main routine from the step 1002 to the step 1004 in FIG. 3 is repeated in accordance with the control program. Then, when the CPU 100 receives an ignition timing interruption signal from the interruption control unit 102, even if the main routine is under execution, the CPU 100 immediately interrupts the execution of the main routine and the processing proceeds to the interruption processing routine of a step 1010.

At a step 1011, the CPU 100 inputs from the counter 101 a pulse count T180 which is obtained by the counting at every 180° crank angle and indicative of the engine speed Ne and also inputs from the analog input port 104 a digital value Pm indicative of the intake pressure, thereby computing and storing the values of Ne and Pm in the RAM 107.

A step 1012 determines whether the number of ignition event count value n is zero, namely, it is at the start of the dither period (see n in FIGS. 12 and 15), and the step 1012 branches to YES and proceeds to a step 1013 when it is at the start, while the step 1012 transfers to a step 1014 when it is not at the start. The step 1013 computes an advance step (advanced ignition) dither period or a retard step (retarded ignition) dither period $L_2$, a count period $\Delta L$ for counting clock pulses to obtain a comparison engine speed Ns for discriminating the direction of the optimum ignition timing, a count starting ignition events number $L_1$ indicative of the number of ignition events from the dither start at which the counting of clock pulses is to be started (thus $\Delta L = L_2 - L_1$) and an ignition timing dither quantity $\theta_D$, and the step 1013 also sets $Nc = \Delta L$ and stores it in the RAM 107.

As shown in FIG. 7A, even when the ignition timing $\theta$ is shifted using the same dither quantity $\theta_D$ and dither period $L_2$, the amount of change of the engine speed Ne differs as indicated at $Ne_1$ and $Ne_3$ in FIG. 7A depending on the engine operating condition (here, the intake pressures $Pm_1$ and $Pm_3$ as shown in FIG. 6). Thus, by preselecting dither quantities $\theta_{DPm1}$ and $\theta_{DPm3}$ and dither periods $L_{2Pm1}$ and $L_{2Pm3}$ depending on the engine operating condition as shown in FIG. 7B, the respective resultant changes of the engine speed, $Ne_{Pm1}$ and $Ne_{Pm3}$, assume values which are substantially similar to each other.

Generally, when the engine speed is maintained constant, the relation of the intake pressure (engine load) and the engine torque with the ignition timing becomes as shown in FIG. 6, that is, the torque varies gently with variations in the ignition timing when the intake pressure is low ($Pm_3$) at the fully closed position of the throttle valve, namely, when the load is low, and the slope becomes steeper as the intake pressure increases from $Pm_3$ to $Pm_2$ and $Pm_1$ (as the load increases). As a result, the controllability can be improved if the value of the dither quantity $\theta_D$ is determined by the following equation depending on the engine operating condition:

$$\theta_D = (\theta_B = \theta_2) \times K_1$$

(where $\theta_B$ is a basic ignition timing and $K_1$ is a constant). By operating the engine with the ignition timing varied on the basis of the dither quantity $\theta_D$ determined by the above equation, it is possible to accurately determine the direction of improving the fuel consumption rate under all engine operating conditions, and also it is possible to keep the engine speed change caused by the dither within a given percentage of the engine speed at the time of the control, thereby preventing deterioration of the driving performance. As regards the positive or negative sign of the dither quantity $\theta_D$ to be determined by the above equation, if the current ignition timing condition is at an advance step shown at (1) of FIG. 12, which operates the engine at an advanced ignition timing with respect to the computed ignition timing $\theta = \theta_B + \theta_1 + \theta_2$ (where $\theta_B$ is a basic ignition timing determined by the current intake pressure and engine speed as shown in FIG. 11), a positive dither quantity $+\theta_D$ is used. While, if it is at a retard step which operates the engine at a retarded ignition timing with respect to the computed ignition timing, a negative dither quantity $-\theta_D$ is used.

According to the present invention, the period $\Delta L$ for counting the number of ignition events is changed with the engine speed, and the count period $\Delta L$ is prolonged with an increase in the engine speed as shown in FIG. 8. Further, in the case of a four-cylinder engine an ignition event occurs at every 180° crank angle of the engine. Thus, the count period is selected to include an ignition event number which is an integral multiple of the number of cylinders so as to average the combustion conditions of the four cylinders, thereby preventing data dispersion from being caused by the difference in torque, etc. among the cylinders.

Then, the comparison engine speed Ns is obtained from the following equation:

$$Ns = \frac{Nc \times K_2}{Cp}$$

where
Nc = number of ignition events occurring during clock pulse count period ($\Delta L$),
$K_2$ = constant of $3.75 \times 10^6$,
Cp = number of clock pulses (each thereof having repetition period of 8 μs) occurring during count period.

Figure 9:
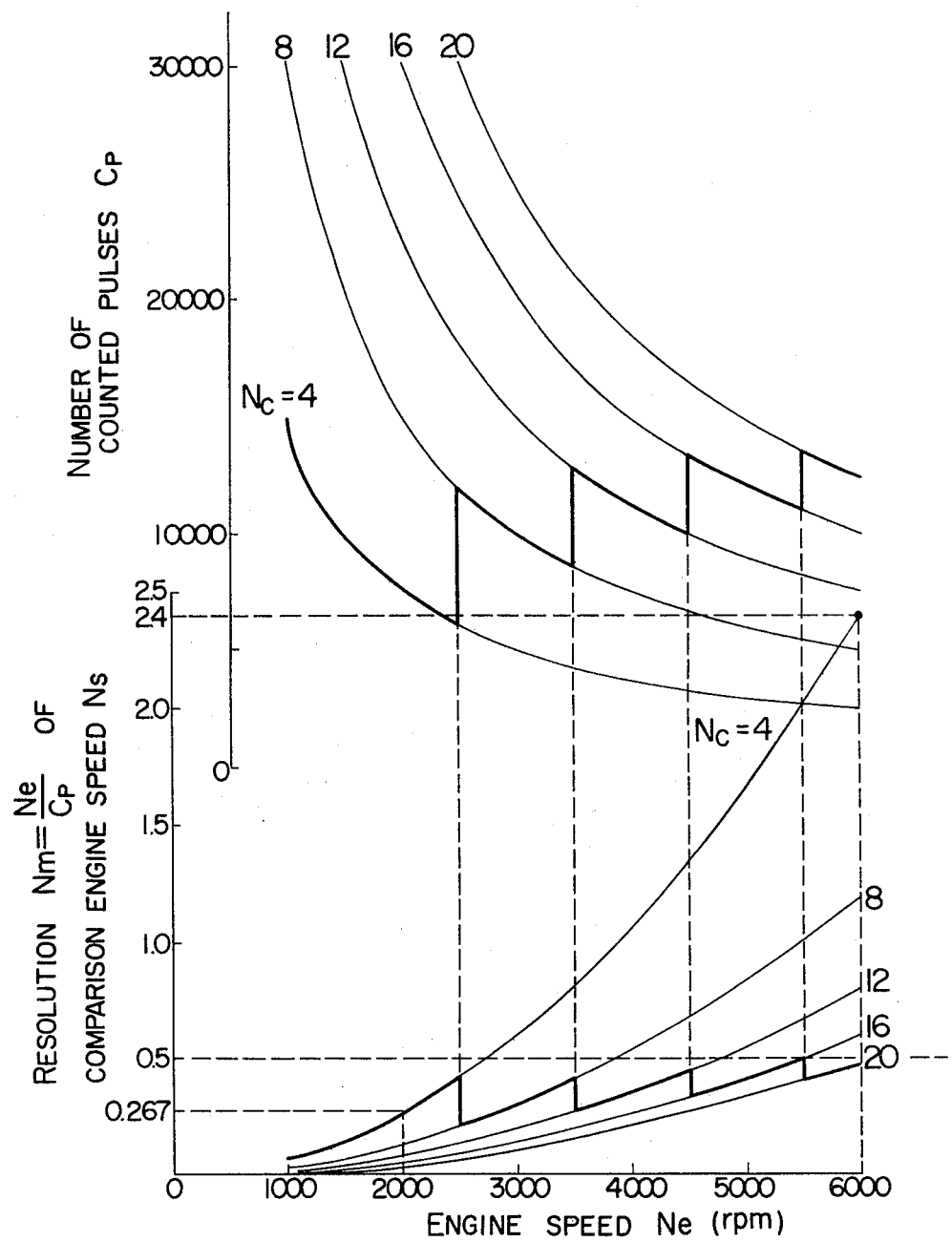
FIG. 9 is a characteristic diagram showing the relation of the number of counted pulses and the resolution of the comparison speed versus the engine speed.

FIG. 9 shows the relation of the number of counted pulses Cp and the resolution of Ns versus the engine speed.

According to FIG. 9, if Nc is fixed to 4, for example, the number of counted pulses Cp decreases with an increase in the engine speed. Thus, when Nc=4, the resolution (Nm) of the comparison engine speed Ns given by Nm=Ne/Cp becomes Nm=2.4 rpm at 6,000 rpm as compared with Nm=0.267 rpm at 2,000 rpm. The engine speed changes caused by the dithering of the ignition timing can be detected with higher sensitivity as the value of the resolution decreases, and therefore it is desirable to reduce the value of the resolution as far as possible. On the other hand, the illustration of FIGS. 7A and 7B shows clearly that the changes of the engine speed can be detected more markedly by measuring the comparison engine speed Ns near the end of the dither period $L_2$. The best compromise between the two situations has been sought, and it has been found by experiments that satisfactory results can be obtained by maintaining the resolution Nm substantially at a constant value with respect to the engine speeds. Such a satisfactory characteristic is shown by the thick solid curve is FIG. 9. In this way, the value of the resolution Nm can be maintained to be substantially 0.5 rpm and below.

FIG. 10 shows the relation of the dither period $L_2$ and the clock pulse counting start position $L_1$ versus the engine speed Ne which are determined by the above investigation. Here, the count period $\Delta L$ is given by $\Delta L = L_2 - L_1$.

Returning to the flow chart of FIG. 3, the step 1014 computes the comparison engine speed Ns for each clock pulse counting period and stores the obtained Ns in the RAM 107.

Figure 5:
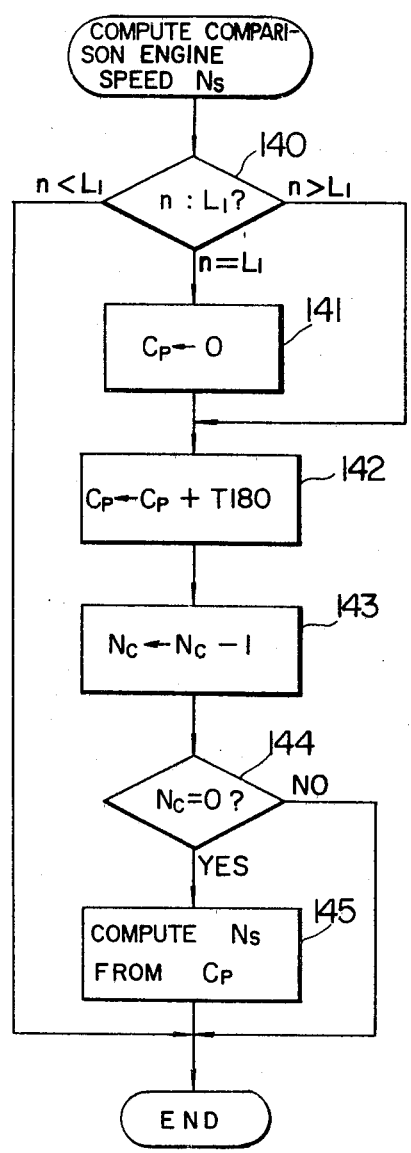

FIG. 5 shows a detailed flow chart for the step 1014 in FIG. 3. In FIG. 5, a step 140 compares the count value n of the number of ignition events from the dither start with the count starting ignition event number $L_1$ computed at the step 1013. If $n < L_1$, the step 1014 ends without performing any operation and the processing proceeds to the next step 1015 in FIG. 3. If $n = L_1$, a step 141 sets Cp=0. If $n > L_1$, then the processing proceeds to a step 142. The step 142 performs the operation of addition to Cp of the clock pulse count T180 obtained at every ignition event or 180° crank angle after the start of the clock pulse counting. In other words, where the count period $\Delta L$ contains four ignition events, the addition of the clock pulse count T180 is performed four times.

Since the step 1013 of FIG. 3 has set Nc=$\Delta L$ to make it possible to determine the current position in the count period, the value of Nc is decreased by 1 in a step 143 at every ignition event or at every addition of T180. A step 144 determines whether the value of Nc is zero. If Nc=0, it is determined that the given count period $\Delta L$ has come to an end, and the step 144 branches to YES. A step 145 computes Ns from Cp and stores the value of Ns in the RAM 107. In this case, the computation of Ns is effected by the following equation as previously described in connection with the step 1013 in FIG. 3:

$$Ns = \frac{Nc \times K_2}{Cp}$$

If the step 144 determines that the value of Nc is not zero, it is decided that the operation of addition of T180 is still in progress and thus the processing proceeds to a step 1015 without effecting the computation of Ns.

The step 1015 computes a basic advance angle $\theta_B$ (a theoretical ignition angle value) in accordance with the corresponding values of engine operating parameters, i.e., the engine speed Ne and the intake pressure Pm in this case, in the data map shown in FIG. 11 and stored in the RAM 107.

Then, the processing proceeds to a step 1016 which computes a learning advance angle $\theta_2$ in accordance with the corresponding values of engine operating parameters, i.e., the engine speed Ne and the intake pressure Pm in this case, in a data map stored in the RAM 107. Here, the learning advance angle $\theta_2$ is a currection value for correcting the basic advance angle $\theta_B$ and is obtained as an experimental value or test value by operating the engine, and the data map of the values of the learning advance angles $\theta_2$ has the similar form as the data map of the basic advance angles $\theta_B$ shown in FIG. 11. A step 1017 computes a final ignition angle $\theta$ by the equation $\theta = \theta_B + \theta_1 + \theta_2 + \theta_D$ using the values of the basic advance angle $\theta_B$, the learning advance angle $\theta_2$, the correction advance angle $\theta_1$ and the dither quantity $\theta_D$. A step 1019 increases the number of ignition event count value n by 1, and a step 1020 returns the processing to the main routine. When the processing returns to the main routine, it returns to the processing step of the main routine which was previously interrupted by the interruption processing.

Then, when the processing returns to the step 1004 of the main routine, the step 400 in FIG. 4 decides that the number of ignition events has reached the preset number $L_2$, which implies that an advance step or a retard step has ended. In this case, the next step 401 replaces the comparison engine speed Ns obtained by the current dither by NO, the latest comparison engine speed NO designated when passing the step 401 at the preceding time by N−1, the comparison engine speed N−1 designated at the last but one time by N−2, and the comparison engine speed N−2 designated at the last but two time by N−3, respectively.

Then, the processing proceeds to a step 402 which determines whether the dither quantity $\theta_D$ is positive or negative. If the comparison engine speed Ns replaced by NO belongs to an advance step, the step 400 branches to YES and transfers to a step 405. While, if it belongs to a retard step, the step 402 branches to NO and proceeds to a step 403. In the case of the retard step where the step 402 branches to NO, the step 403 compares the values of the comparison engine speeds of the current retard step, the preceding advance step, the last but one retard step, and the last but two advance step with one another. If the comparison engine speed of the advance step is higher than that of the retard step, that is, the engine speed has increased, it is decided that the fuel consumption rate can be improved by advancing the ignition timing, and the step 403 branches to YES. Then, a step 408 corrects the learning advance angle $\theta_2$ corresponding to the engine operating conditions stored in the RAM 107 by adding a learning correction angle $\theta_3$ thereto and stores the result again in the corresponding location in the RAM 107. If the decision of the step 403 is NO, the processing proceeds to a step 404. If, conversely, the comparison engine speed of the advance step is lower than that of the retard step, it is decided that the fuel consumption rate can be improved by retarding the ignition timing, and the step 404 branches to YES and the processing proceeds to a step 407 thereby subtracting the learning correction angle $\theta_3$ from the learning advance angle $\theta_2$ contrary to the step 408. If the decision of the step 404 is NO, the processing proceeds to a step 409 and in this case the learning advance angle is not corrected.

On the other hand, if the step 402 decides that the dither quantity $\theta_D$ is positive, that is, the current step is an advance step, the step 402 branches to YES and transfers to a step 405 where the same comparison operation as the step 403 is effected. If the comparison engine speed becomes lower than previously, the step 405 branches to YES and transfers to a step 407, thereby correcting the learning advance angle by subtraction. If the decision is NO, the step 405 proceeds to a step 406. If the comparison engine speed becomes higher than previously, the step 406 branches to YES and proceeds to the step 408 thereby correcting the learning advance angle by addition. In all other cases, the learning advance angle is not corrected. Then, the step 409 initiatizes or sets the count value of the ignition event number to zero. Then, as shown in FIG. 3, the processing returns to the step 1002 to repeat the processing of the main routine.

Figure 12:
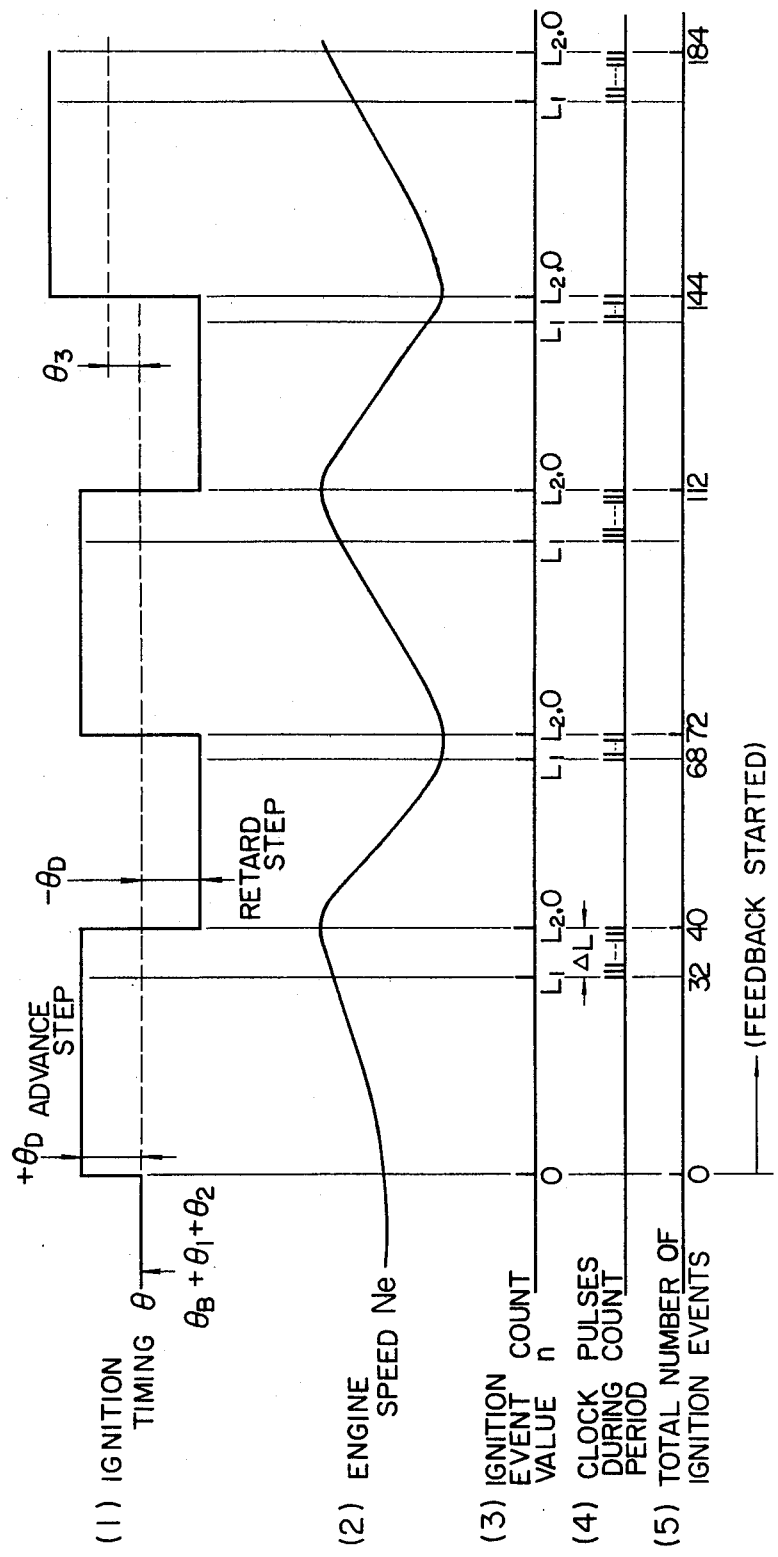
FIG. 12 is a characteristic diagram showing an example of the change with time of the operating condition of the engine subjected to the ignition timing control in this invention.

The manner of the above-described control will now be explained with reference to the time chart shown in FIG. 12. If the current ignition timing is an advance step for operating the engine at an advanced ignition timing with respect to the calculated ignition timing $\theta = \theta_B + \theta_1 + \theta_2$ shown at (1) of FIG. 12, the computation for obtaining the positive dither quantity $+\theta_D$ is performed. If it is a retard step for operating the engine at a retarded ignition timing with respect to the calculated ignition timing, the computation for obtaining the negative dither quantity $-\theta_D$ is performed. At (1) of FIG. 12, the symbol $\theta_3$ designates the learning correction angle. Shown at (2) of FIG. 12 is the changing state of the rotational speed Ne, and shown at (3) of FIG. 12 are the positions of the ignition event count value n counted from the start of dithering, in which $L_1$ indicates the clock pulse counting start positions and $L_2$ indicating the clock pulse counting end positions. Shown at (4) of FIG. 12 are the clock pulses counted during the clock pulse count periods, and shown at (5) of FIG. 12 is the total number of ignition events. From the illustration at (3) of FIG. 12 it is also seen that the clock pulse count period ($\Delta L = L_2 - L_1$) varies depending on the engine speed, that is, the clock pulse count period is prolonged with an increase in the engine speed as illustrated in FIG. 8.

While, in the above-described embodiment, the ignition timing is controlled at the optimum ignition timing which provides the maximum engine torque, the control of the air-fuel ratio of an engine can be attained by a similar method to provide a least fuel consumption rate or a maximum output.

Figure 13:
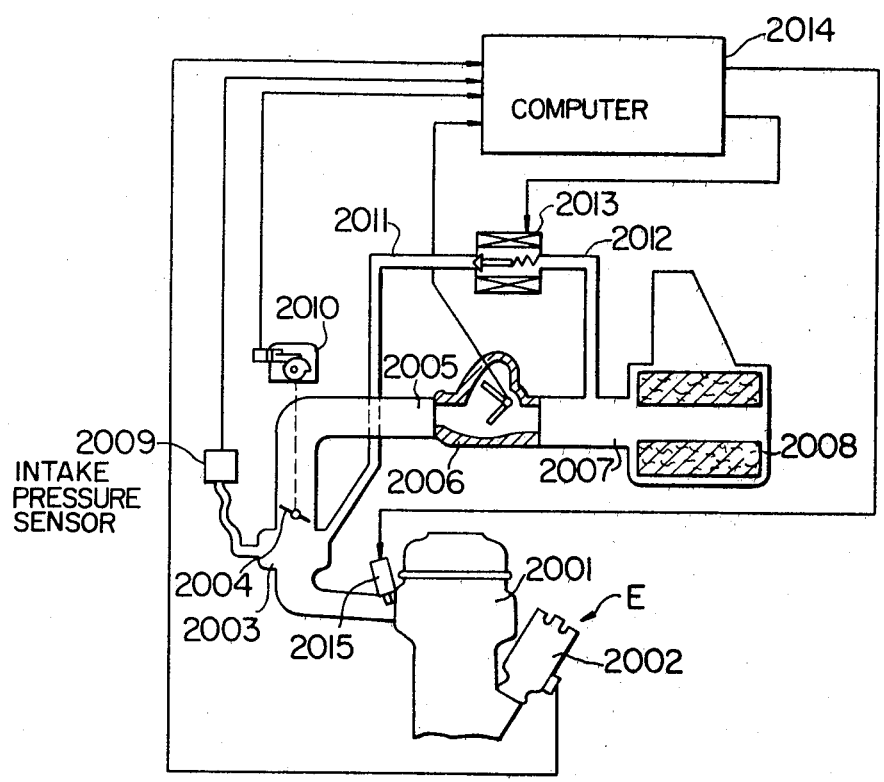
FIG. 13 is a schematic diagram showing the construction of an apparatus for controlling the air-fuel ratio in a second embodiment of this invention.

FIG. 13 shows the construction of another embodiment of this invention for controlling the air-fuel ratio of an engine to provide the least fuel consumption rate.

The air-fuel ratio control apparatus for an engine shown in FIG. 13 comprises an engine body 2001, a rotational angle sensor 2002 incorporated in a distributor, an intake pipe 2003 arranged downstream of a throttle valve 2004 which is operatively linked to an accelerator pedal and an air flow sensor 2006. The air flow sensor 2006 comprises a baffle plate positioned in an air passage so that the opening degree of the baffle plate changes depending on the amount of air flow, and its output voltage changes in response to the opening degree of the baffle plate thereby making it possible to detect the amount of air flow. The air-fuel ratio control apparatus of FIG. 13 further comprises a downstream air supply pipe 2005 for communication between the air flow sensor 2006 and the throttle valve 2004, an air cleaner 2008, an upstream air supply pipe 2007 for communication between the air flow sensor 2006 and the air cleaner 2008, an intake pressure sensor 2009 for detecting the intake pressure, a throttle sensor 2010 for detecting the fully closed position of the throttle valve 2004 and the opening degree of 60% or more of the throttle valve 2004, a bypass air electromagnetic valve 2013 arranged to bypass the air flow sensor 2006 and the throttle valve 2004, a downstream bypass air pipe 2011 for communication between the bypass air electromagnetic valve 2013 and the intake pipe 2003, an upstream bypass air pipe 2012 for communication between the bypass air electromagnetic valve 2013 and the upstream air supply pipe 2007, and a control computer 2014. The control computer 2014 receives output signals from the air flow sensor 2006, the rotational angle sensor 2002, the throttle sensor 2010 and the intake pressure sensor 2009 and computes the quantity of fuel to be injected from an injection valve 2015 at that time in terms of a pulse time width to form an output signal for application to the fuel injection valve 2015.

Figure 14:
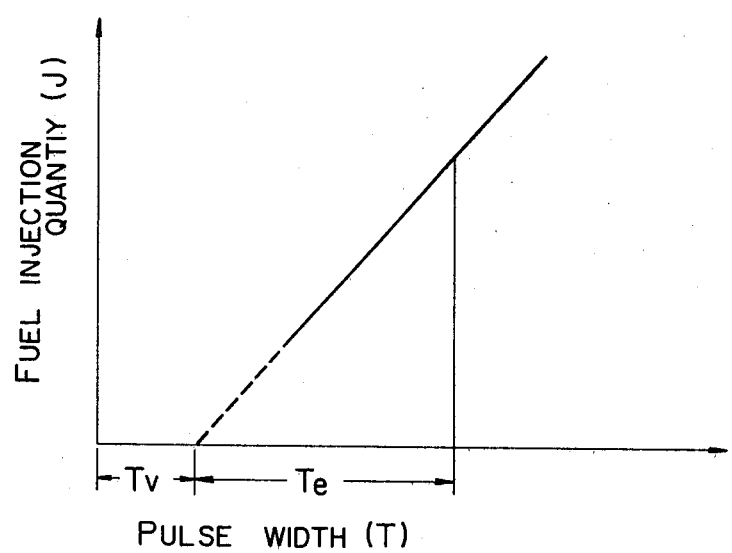
FIG. 14 is a characteristic diagram showing the relation of the fuel injection quantity versus the pulse width applied to the electromagnetic injection valve shown in FIG. 13.

FIG. 14 shows the relation between the fuel injection quantity and the time width of pulses applied to the electromagnetic injection valve 2015 by which the fuel of constant pressure is injected intermittently. The fuel injection quantity J from the injection valve increases linearly with an increase in the width T of the output pulses generated by the control computer 2014. In FIG. 14, Tv denotes a valve opening and closing dead time corresponding to the sum of an opening delay time and a closing delay time of the injection valve, and Te denotes the effective portion of the time width of the injection valve controlling pulse.

Figure 15:
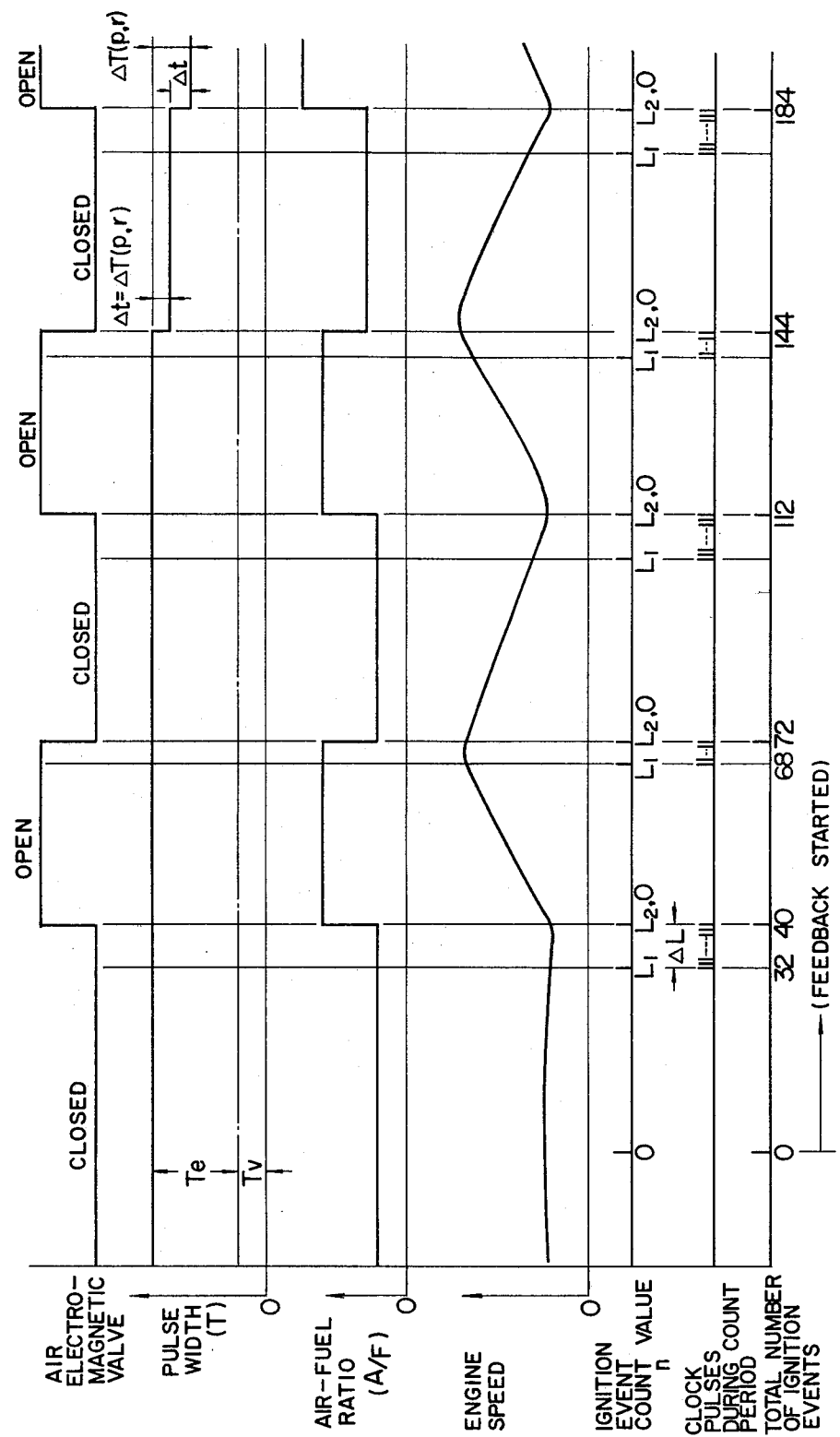
FIG. 15 is a characteristic diagram showing an example of the change with time of the operating condition of the engine subjected to the air-fuel ratio control in this invention.

With the construction described above, when the amount of air flow measured by the air flow sensor 2006 is constant and the amount of fuel flow is constant and when the bypass air is switched on and off by the bypass air electromagnetic valve 2013 thereby changing the air-fuel ratio, the engine speed differs between the cases where there is bypass air supply (namely, when the air-fuel ratio becomes large) and where there is no bypass air supply (namely, when the air-fuel ratio becomes small). Since the direction of the change of the air-fuel ratio which increases the engine speed is the direction of improving the fuel consumption rate, the pulse width T indicative of the fuel injection quantity can be corrected in accordance with the direction in which the engine speed increases. FIG. 15 shows an example of the change with time of the air-fuel ratio control. The correction amount $\Delta T$ (p, r) of the pulse width (T) shown in FIG. 15 is given by reading a learning correction pulse width $\Delta T$ (p, r), which is determined by the values of the engine speed Ne and intake pressure Pm in a data map of pulse width correction values similar to the data map shown in FIG. 11, from the corresponding location in the RAM storing the data map in the control computer 2014. Also, in FIG. 15, $\Delta t$ denotes an incremental correction amount per one decision which corrects the learning correction pulse width $\Delta T$ (p, r) each time one engine speed change is decided, and the value of $\Delta T$ (p, r) corrected by adding or subtracting the incremental correction amount thereto or therefrom, respectively, is stored in the corresponding location in the RAM.

The throttle sensor 2010 is a switch which detects the idling throttle valve position and the throttle valve positions at and around the fully open throttle valve position. The throttle sensor 2010 is used to limit the operating region of the air-fuel ratio control for seeking a least fuel consumption rate to the engine operating conditions other than the idling state and the fully open throttle valve position.

In the like manner as the case described in connection with FIGS. 8 to 10, also in the case of the above-described air-fuel ratio control, it is possible to detect the change of the engine speed with elevated sensitivity by having the count period $\Delta L$ varied as a function of the engine speed, thereby ensuring excellent control performance. Also, in the case of the air-fuel ratio control for seeking a maximum output, the control can be accomplished by varying the amount of fuel flow but with the amount of air flow being maintained constant. Also in this case, the same effect as mentioned above can be obtained by varying the count period ΔL as a function of the engine speed.

As described hereinabove, in accordance with the present invention, in a method and apparatus for optimum control of an engine of this invention using the ignition timing of the engine as a control variable for effecting the optimum control with a view to improving the fuel consumption rate or the engine output which: selects at least two ignition timings which are different from each other and are in the vicinity of but are apart by a given amount of ignition timing (dither quantity) from a calculated ignition timing determined in accordance with the operating condition of the engine; operates the engine at at least two selected ignition timings alternately for a given time period (dither period); detects signals indicative of the engine speeds operated at these ignition timings; compares at least three successive engine speed signals with one another which have been detected while the engine is operated at the at least two selected ignition timings; decides whether the calculated ignition timing is advanced or retarded with respect to the optimum ignition timing for obtaining the least fuel consumption rate or the maximum output; and corrects the calculated ignition timing in accordance with the result of the decision; the time period for detecting changes of the engine speed caused by the dithering of the ignition timing, namely, the clock pulse count counting period is prolonged with an increase in the engine speed, whereby any deterioration in the resolution of the comparison engine speeds can be prevented with the resulting remarkable effect of accurately controlling the ignition timing at an optimum value with a small dither quantity and a short dither period.

Further, the same remarkable effect can be obtained in the control using the air-fuel ratio or the amount of fuel supply as a control variable for accomplishing the same purpose as the above-described optimum control method and apparatus.

Still further, in the above-described optimum control method and apparatus, it is possible to determine the engine speed change detecting period to encompass a combustion event number which is an integral multiple of the number of the engine cylinders, thereby eliminating the effect of the variation of the engine speed due to the differences of the combustion state among the respective cylinders.

We claim:

1. In a method for optimum control of an internal combustion engine comprising the steps of:
    calculating a value of one of plural control variables of said engine in response to an operating condition of said engine;
    dithering the value of said control variable with a predetermined value from the calculated value of said control variable;
    operating said engine at the dithered value of said control variable;
    detecting a resulting change of a rotational speed of said engine during a predetermined time period;
    deciding a direction of changing the value of said control variable toward an optimum value thereof in accordance with a result of said detection;
    correcting the value of said control variable in said direction toward the optimum value thereof, the improvement wherein said predetermined time period is varied in accordance with the rotational speed of said engine.

2. A method according to claim 1, wherein said control variable of said engine is an ignition timing.

3. A method according to claim 1, wherein said control variable of said engine is an air-fuel ratio.

4. A method according to claim 1, wherein said predetermined time period encompasses combustion times of said engine which are an integral multiple of a total number of cylinders of said engine.

5. An apparatus for optimum control of an internal combustion engine in which said engine is operated by dithering an ignition angle, which is one of plural control variables for operating said engine from an ignition angle calculated in accordance with detection values of operating parameters of said engine, and a direction of improving an output torque of said engine is decided in accordance with a detected change of an operating condition of said engine thereby correcting said calculated ignition angle in said direction, said apparatus comprising:
    ignition means for igniting a mixture of gas in said engine;
    a rotational angle sensor responsive to the operation of said engine for generating rotational angle signals;
    an intake pressure sensor;
    a microcomputer; and
    power supply means;
    said microcomputer comprising input ports for inputting output signals from said sensors, means for receiving the output signal from said rotational angle sensor to generate a signal indicative of engine speeds, processor means, storage means for storing data of basic ignition angles and data of learning advance angles which are determined respectively in accordance with engine speeds and intake pressures of said engine, and energization and ignition control means;
    whereby said microcomputer performs operations including computing said basic ignition angles, said learning advance angles, a dither quantity, a dither period and a start time of said direction deciding operation; deciding said direction of improving the output torque of said engine in accordance with a change of the engine speed detected during a time period of said direction deciding operation; computing a learning advance angle correction amount in accordance with a result of said direction deciding operation; obtaining a final ignition angle; generating drive signal for driving said ignition means on the basis of said final ignition angle; and supplying said drive signal to said ignition means through said energization and ignition control means; and wherein the time period of said direction deciding operation is increased or decreased, as the engine speed increases or decreases respectively.

6. An apparatus for optimum control of an internal combustion engine in which said engine is operated by dithering an air-fuel ratio, which is one of control variables for operating said engine, from an air-fuel ratio calculated in accordance with detection values of operating parameters of said engine, and a direction of improving a fuel consumption rate of said engine is decided in accordance with a detected change of an operating condition of said engine thereby correcting said calculated air-fuel ratio in said direction, said apparatus comprising:
    electromagnetic fuel injection valves for supplying injection fuel to said engine;

a rotational angle sensor responsive to the operation of said engine for generating a rotational angle signal;

a throttle valve;

an intake air pipe for communication between said throttle valve and intake ports of said engine;

an air flow sensor for detecting a rate of air flow supplied to said engine;

a downstream air supply pipe for communication between said air flow sensor and said throttle valve;

an upstream air supply pipe for communication between said air flow sensor and an air cleaner;

a bypass air electromagnetic valve communicating with said upstream air supply pipe through an upstream bypass air pipe and with said intake air pipe through a downstream bypass air pipe, thereby bypassing said air flow sensor and said throttle valve;

a microcomputer; and power supply means;

said microcomputer comprising storage means for storing data of learning correction pulse time widths, which are used to correct a time width of a drive pulse for driving said electromagnetic fuel injection valves, and said microcomputer operating to receive output signals from said air flow sensor and said rotational angle sensor, to produce engine speeds from an output signal from said rotational angle sensor, to compute the time width of the drive pulse, to read the learning correction pulse time width from said storage means, to correct the time width of the drive pulse with the read learning correction pulse time width, to supply a corrected drive pulse to said electromagnetic fuel injection valves, to supply a drive signal to said bypass air electromagnetic valve thereby to effect the dithering of the air-fuel ratio, to decide a direction of improving the fuel consumption rate in accordance with a change of the engine speed detected during a time period of said direction deciding operation within a time period of the dithering, and is correct the read learning correction pulse time width in accordance with a result of said direction deciding operation;

wherein the length of the time period of said direction deciding operation is increased or decreased as the engine speed increases or decreases, respectively.

7. An apparatus according to claim 6, further comprising a throttle sensor operatively interlinked with a moving part of said throttle valve for detecting that the opening of said throttle valve is at an idling position and at and around a fully open position, respectively, and supplying a detection signal to said microcomputer.

* * * * *